United States Patent
Hill et al.

(10) Patent No.: US 7,992,663 B2
(45) Date of Patent: Aug. 9, 2011

(54) AIR COOLING SYSTEM FOR ELECTRIC DRIVE MACHINE

(75) Inventors: Andrew D. Hill, Jonesboro, AR (US); Mary Jill Trumper, Sullivan, IL (US); Kris E. Seitz, Bethany, IL (US); Sanjeev Bharani, Normal, IL (US); Cameron T. Lane, Decatur, IL (US); Thomas N Brooks, Jr., Oakley, IL (US)

(73) Assignee: Caterpillar Inc., Peoria, IL (US)

( * ) Notice: Subject to any disclaimer, the term of this patent is extended or adjusted under 35 U.S.C. 154(b) by 593 days.

(21) Appl. No.: 12/150,222

(22) Filed: Apr. 25, 2008

(65) Prior Publication Data

US 2009/0266632 A1 Oct. 29, 2009

(51) Int. Cl.
*B60K 11/06* (2006.01)
(52) U.S. Cl. .................................... 180/68.1
(58) Field of Classification Search ............ 180/68.1, 180/68.2, 65.1
See application file for complete search history.

(56) References Cited

U.S. PATENT DOCUMENTS

| | | | | |
|---|---|---|---|---|
| 4,364,444 A | * | 12/1982 | Donato et al. | 180/65.1 |
| 4,593,779 A | | 6/1986 | Krohling | |
| 6,216,778 B1 | * | 4/2001 | Corwin et al. | 165/299 |
| 6,478,100 B1 | * | 11/2002 | Grewe | 180/65.245 |
| 6,837,322 B2 | * | 1/2005 | Jurado et al. | 180/65.245 |
| 6,979,913 B2 | * | 12/2005 | Storm et al. | 290/17 |

FOREIGN PATENT DOCUMENTS

JP 2007112268 A * 5/2007

* cited by examiner

*Primary Examiner* — J. Allen Shriver, II
*Assistant Examiner* — James Triggs
(74) *Attorney, Agent, or Firm* — Liell & McNeil (57) ABSTRACT

An electric drive machine includes an internal combustion engine remotely coupled to an electrical power generator, which is electrically connected to an electrical components system. The electrical components system is electrically connected to a pair of electric drive motors that are configured to drive wheels of the electric drive machine. A cooling system includes a blower fluidly connected to, and positioned downstream of, the electrical components system. The blower is fluidly connected to, and positioned upstream of, the electrical power generator and the pair of electric drive motors.

20 Claims, 4 Drawing Sheets

AIR COOLING SYSTEM FOR ELECTRIC DRIVE MACHINE

TECHNICAL FIELD

The present disclosure relates generally to an air cooling system, and more particularly to an air cooling system including a blower and ductwork for cooling an electrical components system, an electrical power generator remotely coupled to an internal combustion engine, and a pair of electric drive motors of a machine.

BACKGROUND

Electric drive systems for large off-highway machines, such as mining trucks, typically include an alternator, or other electrical power generator, driven by an internal combustion engine. The alternator, in turn, supplies electrical power to a pair of electric drive motors connected to wheels of the machine. It should be appreciated that a significant amount of heat is generated during the operation of the electric drive system. Specifically, the alternator and the electric drive motors, along with various other electrical components, may generate a significant amount of heat and, as such, require cooling to prevent damage or failure. However, cooling of these components provides significant challenges due to space limitations and the relative positioning of each of the components.

U.S. Pat. No. 6,837,322 teaches a ventilation system for an electric drive vehicle utilizing a single centrifugal blower for cooling an alternator, a drive motor, and a control group component. Specifically, the blower is driven by the alternator and is configured to accelerate air in both a radial direction and an axial direction. At least one opening is formed in a perimeter portion of a housing of the blower for receiving the radial airflow, and at least one opening is formed in a side portion of the housing for receiving the axial airflow. Air is routed from these openings to each of the alternator, drive motor, and control group. Although this ventilation system may provide sufficient cooling for an electric drive machine having a specific configuration, it should be appreciated that a variety of electric drive systems exist, each having a unique configuration and, as such, being subject to unique requirements and spatial constraints. As a result, there is a continuing need for cooling systems having efficient designs that fit within limited space constraints of a machine and, further, provide reduced weight and cost.

The present disclosure is directed to one or more of the problems set forth above.

SUMMARY OF THE DISCLOSURE

In one aspect, an electric drive machine includes an internal combustion engine remotely coupled to an electrical power generator, which is electrically connected to an electrical components system. The electrical components system is electrically connected to a pair of electric drive motors that are configured to drive wheels of the electric drive machine. A cooling system includes a blower fluidly connected to, and positioned downstream of, the electrical components system. The blower is fluidly connected to, and positioned upstream of, the electrical power generator and the pair of electric drive motors.

In one aspect, an air cooling system includes a blower fluidly connected to each of an electrical components system, an electrical power generator, and a pair of electric drive motors. The electrical components system is positioned upstream of the blower, while the electrical power generator and the pair of electric drive motors are positioned downstream of the blower. The electrical power generator and the pair of electric drive motors are fluidly in parallel.

In yet another aspect, a method of cooling components of an electric drive machine includes a step of cooling an electrical components system using ambient air drawn through the electrical components system and through an ambient air passage by a blower. The blower is configured to pressurize the ambient air. An electrical power generator is cooled by directing the pressurized ambient air along a first fluid path from the blower. A pair of electric drive motors is cooled by directing the pressurized ambient air along a second fluid path from the blower.

DETAILED DESCRIPTION

Figure 1:
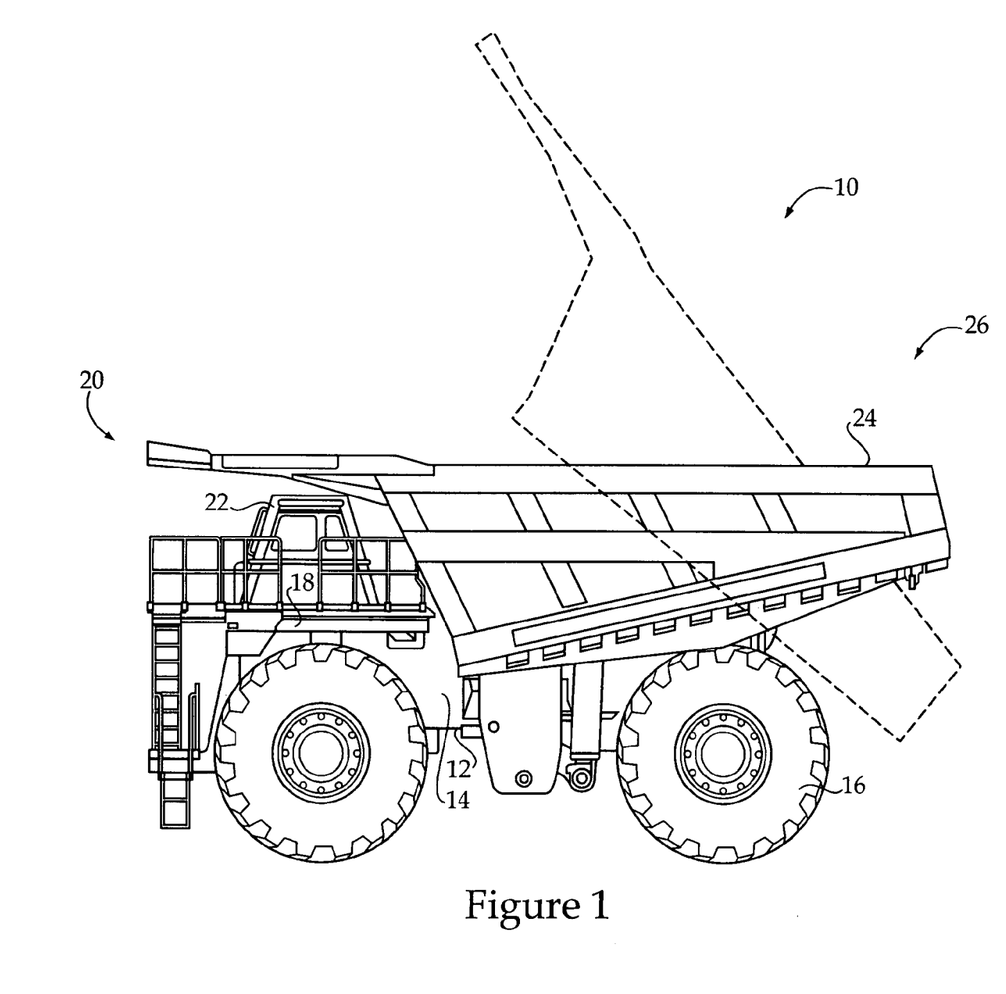
FIG. 1 is a side diagrammatic view of an electric drive machine, according to the present disclosure.

An exemplary embodiment of a machine 10 is shown generally in FIG. 1. The machine 10 may be a mining truck, as shown, or any other off-highway or on-highway vehicle having an electric drive propulsion system. As such, machine 10 may also be referenced herein as an electric drive machine. In the illustrated embodiment, machine 10 generally includes a frame 12 having an electric drive propulsion system 14, discussed later in greater detail, supported thereon for driving wheels of the machine, such as, for example, rear wheels 16 (only one of which is shown). The frame 12 may also support a platform 18 positioned at a front end 20 of the machine 10 and having an operator control station 22 mounted thereon. A dump body 24 is pivotally mounted on the frame 12, at a rear end 26 of the machine 10, such that the dump body 24 is movable between a hauling position, as shown, and a dumping position, shown in phantom.

Figure 2:
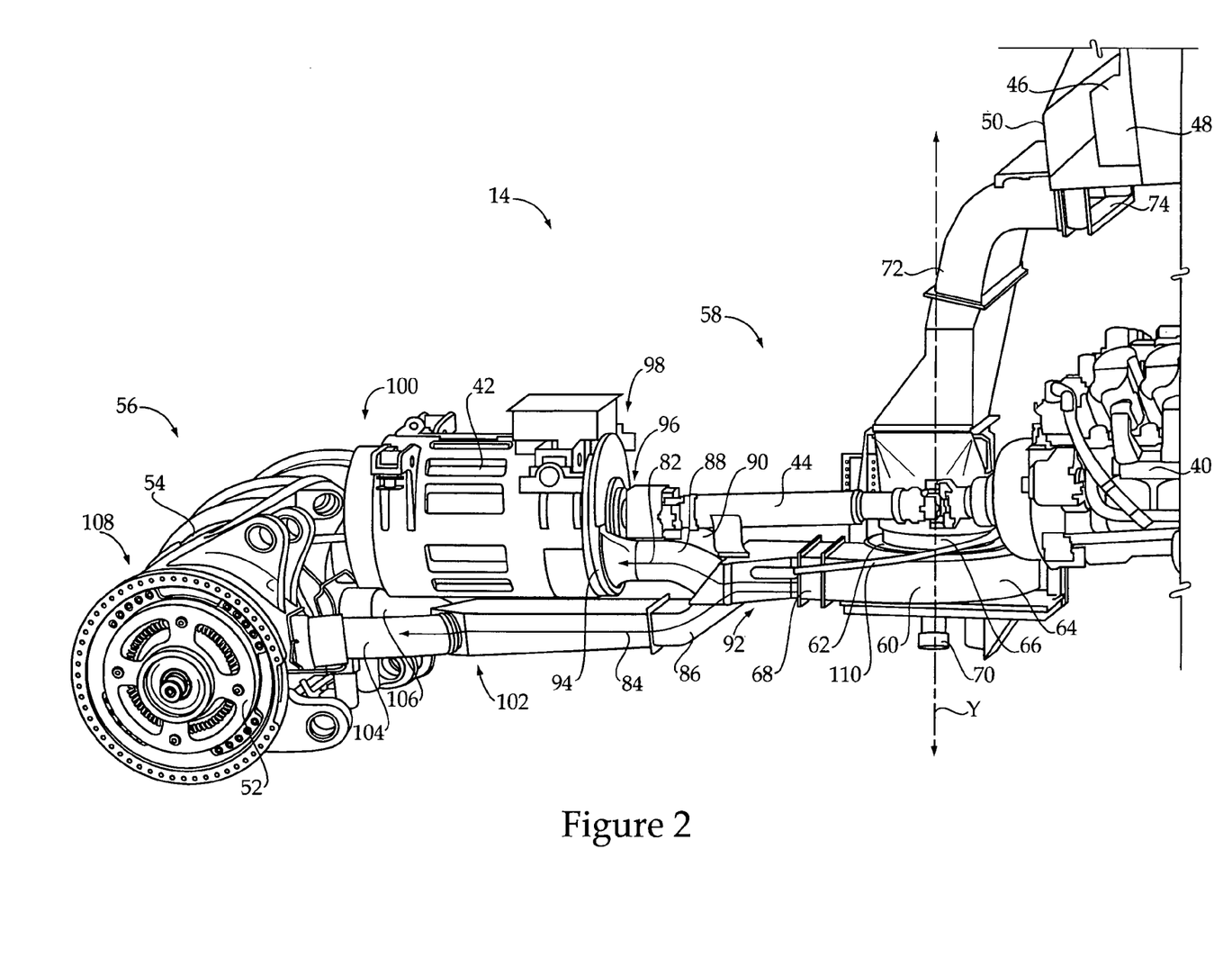
FIG. 2 is a perspective view of an electric drive propulsion system of the electric drive machine of FIG. 1, including an air cooling system therefor.

Turning now to FIG. 2, the electric drive propulsion system 14 includes an internal combustion engine 40, such as, for example, a compression or spark-ignited engine, that provides mechanical power to an electrical power generator 42, such as, for example, an alternator. As shown in the illustrated embodiment, the electrical power generator 42 may be remotely coupled to the internal combustion engine 40, such as through a drive shaft 44. According to one embodiment, the electrical power generator 42 may be mounted to the frame 12, rather than directly to or in close proximity to the internal combustion engine 40, to more evenly distribute weight across the frame 12 of the machine 10. Alternatively, however, the electrical power generator 42 may be belt-driven or directly attached to the internal combustion engine 40, as is well known in the art. The electrical power generator 42, in turn, produces electrical power, such as, for example, an alternating electrical current.

It should be appreciated that one or more rectifiers (not shown) may also be used to convert the alternating electrical current to a direct electrical current, as necessary. Alternatively, however, a direct electrical current may be produced and converted to an alternating electrical current, using an inverter 46. According to one embodiment, the electrical power generator 42 may be electrically connected to an electrical components system 48 that may include the inverter 46. The inverter 46, along with other electrical components of the electrical components system 48, may be positioned within an inverter cabinet 50, or other suitable housing. Referring also to FIG. 1, the inverter cabinet 50 may be supported on the platform 18 of the machine 10 and, further, may be positioned adjacent the operator control station 22.

The inverter 46 may condition the electrical power produced by the electrical power generator 42 to provide a voltage and current sufficient to power one or more motors, such as, for example, a pair of electric drive motors 52 (only one of which is shown). According to one example, the inverter 46 may modulate the frequency of the power produced by the electrical power generator 42 to control the speed of the pair of electric drive motors 52. The electric drive motors 52 may be, for example, wheel motors used to power rear wheels 16, shown in FIG. 1, to propel the machine 10. It should be appreciated that the electric drive motors 52 may be disposed within a central axle housing 54 of a rear axle assembly 56. Although portions of the rear axle assembly 56 have been removed for illustrative purposes, it should be appreciated that the rear axle assembly 56 may typically include additional components, such as, for example, a final drive assembly and a wheel hub.

The machine 10 also includes an air cooling system, referenced generally at 58, for cooling the components of the electric drive propulsion system 14. The air cooling system 58 includes a blower 60 fluidly connected, such as through ductwork, to the electrical components system 48, the electrical power generator 42, and the pair of electric drive motors 52. Specifically, the blower 60 may be a centrifugal blower and may include an impeller 62 rotatable about a first axis Y. The blower 60 may also include a blower housing 64 having an axially positioned inlet 66 and a radially positioned outlet 68.

It should be appreciated that, according to one embodiment, the blower 60 may be configured to draw ambient air through the axially positioned inlet 66 in a direction that is substantially parallel to the first axis Y. The ambient air that is drawn into the blower 60 may be pressurized and directed through the radially positioned outlet 68 in a direction substantially perpendicular to the first axis Y. According to one embodiment, the blower 60 may be powered by a hydraulic motor 70, receiving its power from a hydraulic pump (not shown) connected to the internal combustion engine 40. However, alternative means for driving the impeller 62 of blower 60 are known and are also contemplated for use with air cooling system 58.

Figure 3:
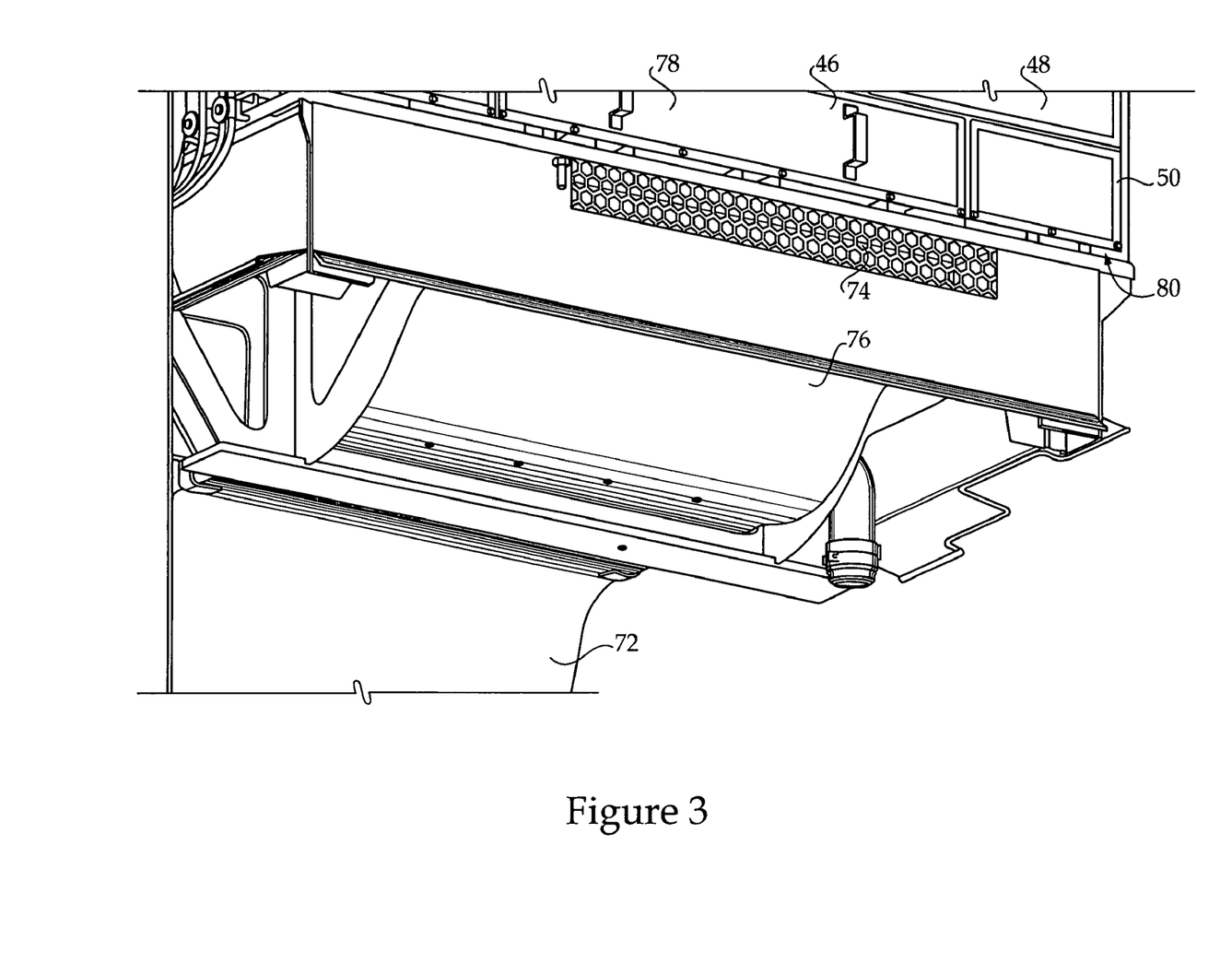
FIG. 3 is a perspective view of an inlet of the air cooling system of FIG. 2.

An inlet duct 72, made of metal or flexible material, or other fluid passage, may fluidly connect the blower 60 to both of the inverter cabinet 50, described above, and an ambient air passage 74, shown in greater detail in FIG. 3. Specifically, as shown in FIG. 3, an inlet housing 76, which may be integral with or attached to the inlet duct 72, may receive ambient air through the inverter cabinet 50. According to one embodiment, the inverter cabinet 50 may include fluid openings (not shown) at a front side 78 thereof for receiving ambient air. The ambient air may then be drawn into the inlet housing 76 through a base 80 of the inverter cabinet 50. Additionally, the inlet housing 76 may receive ambient air directly from the atmosphere through the ambient air passage 74. It should be appreciated that the ambient air passage 74 may be positioned above the platform 18 at the front end 20 of the machine 10 (FIG. 1). As such, it should also be appreciated that the ambient air drawn through the ambient air passage 74 is substantially unobstructed, and provides an air flow into the inlet duct 72 that is not heated by the electrical components system 48.

Referring again to FIG. 2, it should be appreciated that, since the inverter cabinet 50 is positioned upstream of the blower 60, the electrical components system 48 housed therein may be cooled using ambient air drawn through the inverter cabinet 50 by the blower 60. It should also be appreciated that the ambient air drawn through the inverter cabinet 50 may become heated as it passes over the electrical components system 48. This heated air is combined with the ambient air provided directly from the atmosphere through the ambient air passage 74, as described above, and pressurized by the blower 60.

The pressurized ambient air may be directed, from the blower 60, through one or more outlet ducts, or other fluid passages, to cool the electrical power generator 42 and the electric drive motors 52. According to one embodiment, the pressurized ambient air may travel along a first fluid path 82 to cool the electrical power generator 42 and a second fluid path 84 to cool the electric drive motors 52. It should be appreciated that the electrical power generator 42 and the electric drive motors 52, according to the illustrated embodiment, may be fluidly in parallel, i.e., both components receive pressurized ambient air along fluid paths 82 and 84 that may be substantially parallel or inclined toward one another. Initially, however, both of the first and second fluid paths 82 and 84 are directed through a common passage or, more specifically, an intermediate duct 86.

The intermediate duct 86, designed to provide a required flow split of air between the electrical power generator 42 and the electric drive motors 52, may be fluidly connected to the electrical power generator 42 through at least two fluid passages, or ducts, 88 and 90. Fluid passages 88 and 90 may extend from a first end 92 of the intermediate duct 86 and terminate in two quadrants 94 and 96 at a first end 98 of the electrical power generator 42. According to the illustrated embodiment, the fluid passages 88 and 90 may direct pressurized ambient air toward two lower quadrants 94 and 96 of the electrical power generator 42. However, it should be appreciated that one or more passages may be provided to direct pressurized ambient air toward any portion of the electrical power generator 42. The pressurized ambient air, passing through and cooling the electrical power generator 42, may be exhausted through a second end 100 of the electrical power generator 42.

A second end 102 of the intermediate duct 86 may be fluidly connected to the central axle housing 54 through at least two fluid passages, or ducts, 104 and 106. Although two fluid passages 104 and 106 are shown, it should be appreciated that any number of fluid passages may be used to direct pressurized air toward the electric drive motors 52. According to the illustrated embodiment, each of the fluid passages 104 and 106 may be directed toward one of the pair of electric drive motors 52. According to one embodiment, it may be desirable to dimension the intermediate duct 86 so that a cross sectional area of the second end 102 is greater than a cross sectional area of the first end 92. As such, the pressurized ambient air may maintain sufficient pressure as it diverges through the fluid passages 104 and 106. After cooling the electric drive motors 52, the pressurized ambient air may pass through one or more exhaust outlets positioned at a back end 108 of the rear axle assembly 56.

The air cooling system 58 may also include a positive pressure line 110 fluidly connected to the intermediate duct 86, such as at the first end 92 thereof, and the electrical components system 48. Specifically, the positive pressure line 110 may direct pressurized ambient air, or even filtered pressurized ambient air, from the intermediate duct 86 and into the electrical components system 48 to create a positive pressure therein. As a result, dust particles carried by the ambient air that is drawn through a portion of the inverter cabinet 50 by the blower 60 may be prevented from entering, and perhaps contaminating, the electrical components housed within the electrical components system 48. This pressurized section may release pressure periodically, thereby cooling the electrical components within the electrical components system 48.

Figure 4:
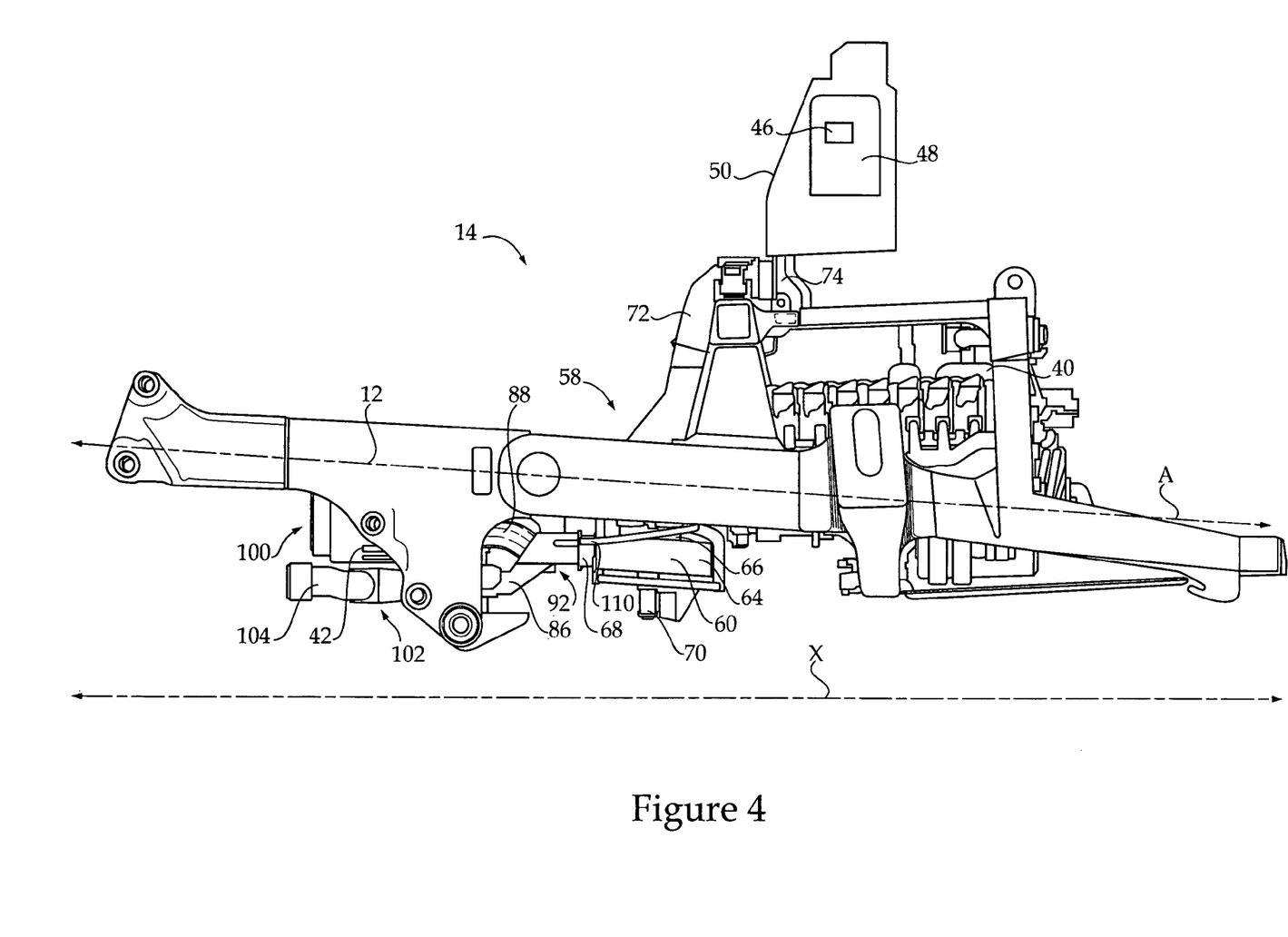
FIG. 4 is a side diagrammatic view of the electric drive propulsion system, and air cooling system therefor, supported by a frame of the electric drive machine, according to the present disclosure.

Turning now to FIG. 4, the electric drive propulsion system 14 and the air cooling system 58 are shown supported by a portion of the frame 12 of machine 10. Specifically, and according to the illustrated embodiment, the electrical power generator 42, positioned remotely from the internal combustion engine 40, may be supported by the frame 12 and, further, may be positioned substantially parallel thereto. It should be appreciated that the frame 12 of the illustrated embodiment may be positioned at an angle greater than zero with respect to a substantially horizontal axis X, which may be substantially parallel with the ground. According to a specific example, the frame 12 may be aligned along an axis A positioned at a slight angle, such as a six-degree angle, with respect to the horizontal axis X.

According to this arrangement, it may be desirable to align the blower 60, and the intermediate duct 86, with the frame 12 and electrical power generator 42 along the axis A. However, it should be appreciated that not all arrangements require such an alignment. By substantially aligning the blower 60 and the electrical power generator 42, a required amount of air or, more specifically, pressurized ambient air may be directed to the electrical power generator 42. According to one embodiment, a majority of the pressurized ambient air may be directed to the electrical power generator 42. It should be appreciated that, in an arrangement requiring cooling of two components that are fluidly in parallel, it may be desirable to align the blower 60 with the component having a higher resistance or pressure drop. According to the illustrated embodiment, the electrical power generator 42 may exhibit higher resistance than the electric drive motors 52 and, as such, it may be desirable to provide a greater airflow to the electrical power generator 42. Other arrangements, as should be appreciated, may require alternative design choices.

The air cooling system 58 may be designed and configured to provide adequate cooling of each component of the electric drive propulsion system 14 during an extreme operating condition of the machine 10. For example, the blower 60 may be sized and, further, may be driven at a speed and frequency for cooling each of the electrical components system 48, the electrical power generator 42, and the electric drive motors 52 during such an extreme operating condition. According to one embodiment, a control algorithm may be used to control operation of the air cooling system 58.

Specifically, a controller (not shown), such an electronic control module for the electric drive propulsion system 14, may communicate with a sensor, such as, for example, a resistance temperature detector, associated with each of the electrical components system 48, the electrical power generator 42, and the electric drive motors 52. The controller may monitor the temperatures of the respective components and ensure that the temperatures are maintained below desirable limits. If it is determined that one of the electrical components system 48, the electrical power generator 42, and the electric drive motors 52 requires cooling, the controller may initiate or alter operation of the blower 60. According to one embodiment, the blower 60 may be operated at a plurality of speeds, such as, for example, a low speed and a high speed. It should be appreciated, however, that various control strategies are contemplated for use with the air cooling system 58.

INDUSTRIAL APPLICABILITY

The present disclosure finds potential application in any machine that utilizes an electric drive propulsion system. Further, the disclosure may be specifically applicable to an electric drive machine having an internal combustion engine coupled to a pair of electric drive motors via a remotely mounted electrical power generator. Yet further, the present disclosure may be applicable to electric drive propulsion systems for machines having significant cooling requirements and strict spatial constraints. Such machines may include, but are not limited to, off-highway machines, such as mining trucks, on-highway machines, such as buses and trucks, and other machines known in the art.

Referring generally to FIGS. 1-4, a machine 10 may include a frame 12 having an electric drive propulsion system 14 supported thereon for driving rear wheels 16 of the machine 10. The electric drive propulsion system 14 may include an internal combustion engine 40 that provides mechanical power to an electrical power generator 42, such as, for example, an alternator. The electrical power generator 42, in turn, may produce electrical power, such as, for example, an alternating electrical current. The frequency of the alternating electrical current may be modulated using an inverter 46 of an electrical components system 48. The electrical components system 48 may be electrically connected to a pair of electric drive motors 52 used to power the rear wheels 16 of the machine 10.

It should be appreciated that, during operation of the machine 10, the electrical power generator 42 and the electric drive motors 52, along with the electrical components system 48, may generate a significant amount of heat and, as such, require cooling to prevent damage or failure. The air cooling system 58, as described herein, may be used to cool each of the electrical components system 48, the electrical power generator 42, and the electric drive motors 52 using a blower 60 and the ductwork described herein. Specifically, the blower 60, using a rotatable impeller 62 powered by a hydraulic motor 70, may cool the electrical components system 48 using ambient air drawn through an inverter cabinet 50, housing the electrical components system 48.

The blower 60 may draw air through both of the inverter cabinet 50 and an ambient air passage 74 positioned to receive ambient air directly from the atmosphere. The combined air is drawn into the blower 60 through an inlet duct 72 and pressurized. The pressurized ambient air may travel along a first fluid path 82 to cool the electrical power generator 42 and a second fluid path 84 to cool the electric drive motors 52. It should be appreciated that the first fluid path 82 extends from the blower 60, through an intermediate duct 86, and through two diverging channels 88 and 90. The second fluid path 84 may extend from the blower 60, through the intermediate duct 86, and through channels 104 and 106. It may be desirable to align an outlet 68 of the blower 60 with a higher resistance component, such as the electrical power generator 42, to direct a majority of an air flow from the blower 60 thereto.

The air cooling system 58 may be designed and configured to provide adequate cooling of each component of the electric drive propulsion system 14 during an extreme operating condition of the machine 10. Further, the air cooling system 58 may be operated using any know control algorithm. As such, the air cooling system 58, described herein, provides efficient cooling of the components of the electric drive propulsion system 14 using a system occupying limited space and having reduced weight and cost.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An electric drive machine, comprising:
   an internal combustion engine remotely coupled to an electrical power generator, wherein the electrical power generator is electrically connected to an electrical components system, and wherein the electrical components system is electrically connected to a pair of electric drive motors configured to drive wheels of the electric drive machine; and
   a cooling system including a blower fluidly connected to and positioned downstream of the electrical components system and an ambient air passage, wherein the blower is fluidly connected to and positioned upstream of the electrical power generator and the pair of electric drive motors.

2. The electric drive machine of claim 1, wherein the blower includes an impeller driven about a first axis by a hydraulic motor and disposed within a blower housing, wherein the blower housing includes an axially positioned inlet and a radially positioned outlet.

3. The electric drive machine of claim 2, wherein the axially positioned inlet includes an inlet housing fluidly connected to both an inverter cabinet housing the electrical components system and the ambient air passage positioned adjacent the inverter cabinet, wherein the inlet housing receives unobstructed air through the ambient air passage.

4. The electric drive machine of claim 2, wherein the radially positioned outlet includes an intermediate duct fluidly connected to the electrical power generator and the pair of electric drive motors, and wherein the intermediate duct is configured to direct a majority of an air flow from the blower to the electrical power generator.

5. The electric drive machine of claim 4, wherein the intermediate duct is fluidly connected to the electrical power generator through at least two fluid passages extending from a first end of the intermediate duct and terminating in two quadrants at a first end of the electrical power generator.

6. The electric drive machine of claim 5, wherein the intermediate duct is fluidly connected to a housing of the pair of electric drive motors through at least two fluid passages extending from a second end of the intermediate duct.

7. The electric drive machine of claim 6, wherein a cross sectional area of the second end of the intermediate duct is greater than a cross sectional area of the first end of the intermediate duct.

8. An electric drive machine, comprising:
   an internal combustion engine remotely coupled to an electrical power generator, wherein the electrical power generator is electrically connected to an electrical components system, and wherein the electrical components system is electrically connected to a pair of electric drive motors configured to drive wheels of the electric drive machine;
   a cooling system including a blower fluidly connected to and positioned downstream of the electrical components system, wherein the blower is fluidly connected to and positioned upstream of the electrical power generator and the pair of electric drive motors;
   wherein the blower includes an impeller driven about a first axis by a hydraulic motor and disposed within a blower housing, wherein the blower housing includes an axially positioned inlet and a radially positioned outlet;
   wherein the radially positioned outlet includes an intermediate duct fluidly connected to the electrical power generator and the pair of electric drive motors, and wherein the intermediate duct is configured to direct a majority of an air flow from the blower to the electrical power generator; and
   further including a positive pressure line fluidly connected to the intermediate duct and a portion of the electrical components system.

9. An air cooling system, comprising:
   a blower fluidly connected to each of an electrical components system, an electrical power generator, and a pair of electric drive motors; and
   wherein the electrical components system and an ambient air passage are positioned upstream of the blower, and the electrical power generator and the pair of electric drive motors are positioned downstream of the blower and are fluidly in parallel.

10. The air cooling system of claim 9, wherein the blower includes an impeller rotatable about an axis and disposed within a blower housing, and wherein the blower housing includes an axially positioned inlet and a radially positioned outlet.

11. The air cooling system of claim 10, wherein the axially positioned inlet includes an inlet housing fluidly connected to both a housing of the electrical components system and the ambient air passage positioned adjacent the housing of the electrical components system, wherein the inlet housing receives unobstructed air through the ambient air passage.

12. The air cooling system of claim 10, wherein the radially positioned outlet includes an intermediate duct fluidly connected to the electrical power generator and the pair of electric drive motors, and wherein the intermediate duct is configured to direct a majority of an air flow from the blower to the electrical power generator.

13. The air cooling system of claim 12, wherein the intermediate duct is fluidly connected to the electrical power generator through at least two fluid passages extending from a first end of the intermediate duct and terminating in two quadrants at a first end of the electrical power generator.

14. The air cooling system of claim 13, wherein the intermediate duct is fluidly connected to a housing of the pair of electric drive motors through at least two fluid passages extending from a second end of the intermediate duct.

15. The air cooling system of claim 14, wherein a cross sectional area of the second end of the intermediate duct is greater than a cross sectional area of the first end of the intermediate duct.

16. An air cooling system, comprising:
   a blower fluidly connected to each of an electrical components system, an electrical power generator, and a pair of electric drive motors;
   wherein the electrical components system is positioned upstream of the blower, and the electrical power generator and the pair of electric drive motors are positioned downstream of the blower and are fluidly in parallel;
   wherein the blower includes an impeller rotatable about an axis and disposed within a blower housing and wherein the blower housing includes an axially positioned inlet and a radially positioned outlet;
   wherein the radially positioned outlet includes an intermediate duct fluidly connected to the electrical power generator and the pair of electric drive motors, and wherein the intermediate duct is configured to direct a majority of an air flow from the blower to the electrical power generator; and further including a positive pressure line fluidly connected to the intermediate duct and a portion of the electrical components system.

17. A method of cooling components of an electric drive machine, comprising:

cooling an electrical components system using ambient air drawn through the electrical components system by a blower;

combining the ambient air drawn through the electrical components system with ambient air drawn from the atmosphere through an ambient air passage by the blower to form combined ambient air;

pressurizing the combined ambient air using the blower to form pressurized ambient air;

cooling an electrical power generator by directing the pressurized ambient air along a first fluid path from the blower; and cooling a pair of electric drive motors by directing the pressurized ambient air along a second fluid path from the blower.

18. The method of claim 17, wherein the first cooling step includes drawing air into an inlet of the blower from a housing of the electrical components system and the ambient air passage.

19. The method of claim 18, wherein the second cooling step includes directing the pressurized ambient air along the first fluid path by directing the pressurized ambient air through an intermediate duct extending from an outlet of the blower and diverging the pressurized ambient air through at least two fluid passages toward the electrical power generator.

20. The method of claim 19, wherein the third cooling step includes directing the pressurized ambient air along the second fluid path by directing the pressurized ambient air through the intermediate duct and diverging the pressurized air through at least two fluid passages toward a housing of the pair of electric drive motors.

* * * * *

UNITED STATES PATENT AND TRADEMARK OFFICE
CERTIFICATE OF CORRECTION

| | | |
|---|---|---|
| PATENT NO. | : 7,992,663 B2 | Page 1 of 1 |
| APPLICATION NO. | : 12/150222 | |
| DATED | : August 9, 2011 | |
| INVENTOR(S) | : Hill et al. | |

It is certified that error appears in the above-identified patent and that said Letters Patent is hereby corrected as shown below:

Title Page, Column 1, Item 75 (Inventors), lines 5-6, delete "Thomas N Brooks, Jr.," and insert -- Thomas N. Brooks, Jr., --.

In the Claims

Column 8, line 62, in Claim 16, delete "housing" and insert -- housing, --.

Signed and Sealed this
Twenty-first Day of July, 2015

Michelle K. Lee
*Director of the United States Patent and Trademark Office*